United States Patent
Lytle et al.

(10) Patent No.: US 7,502,164 B2
(45) Date of Patent: Mar. 10, 2009

(54) SOLID STATE FLUORESCENCE LIGHT ASSEMBLY AND MICROSCOPE

(75) Inventors: Steven W. Lytle, Mill Creek, WA (US); Kevin G. Cassady, Monroe, WA (US)

(73) Assignee: Westover Scientific, Inc., Mill Creek, WA (US)

(*) Notice: Subject to any disclaimer, the term of this patent is extended or adjusted under 35 U.S.C. 154(b) by 0 days.

(21) Appl. No.: 11/838,814

(22) Filed: Aug. 14, 2007

(65) Prior Publication Data
US 2008/0043324 A1 Feb. 21, 2008

Related U.S. Application Data

(60) Provisional application No. 60/837,905, filed on Aug. 14, 2006.

(51) Int. Cl.
*G02B 21/06* (2006.01)
*G02B 21/00* (2006.01)

(52) U.S. Cl. .................. 359/388; 359/368; 359/385; 359/634

(58) Field of Classification Search ......... 359/368–390, 359/885–892, 634; 351/200–247
See application file for complete search history.

(56) References Cited

U.S. PATENT DOCUMENTS

| | | | | |
|---|---|---|---|---|
| 5,349,468 | A | * | 9/1994 | Rathbone et al. ............ 359/390 |
| 6,400,501 | B2 | * | 6/2002 | Tsuchiya et al. ............ 359/380 |
| 7,072,107 | B2 | * | 7/2006 | Filipovich et al. ........... 359/407 |
| 2003/0090792 | A1 | * | 5/2003 | Kenny et al. ................ 359/385 |

* cited by examiner

*Primary Examiner*—Thong Nguyen
(74) *Attorney, Agent, or Firm*—Knobbe Martens Olson & Bear, LLP

(57) ABSTRACT

An illumination system for a fluorescence microscope is provided. The illumination system includes a carriage removably receivable within the microscope and a plurality of filter cubes movably arranged on the carriage, wherein each filter cube is moveable between an active position and an inactive position. Each filter cube includes a housing having first and second openings and a solid state light source secured to the housing. The solid state light source emits light when the filter cube is moved into the active position. Each filter cube further comprises at least one optical filter disposed within the housing, wherein the optical filter corresponds to the solid state light source.

35 Claims, 6 Drawing Sheets

SOLID STATE FLUORESCENCE LIGHT ASSEMBLY AND MICROSCOPE

CROSS-REFERENCE TO RELATED APPLICATION

This application claims the benefit of U.S. Provisional Application No. 60/837,905, filed on Aug. 14, 2006, the disclosure of which is expressly incorporated herein by reference.

BACKGROUND

A fluorescence microscope is a light microscope used to study properties of organic or inorganic substances using fluorescence instead of, or in addition to, reflection and absorption. The fluorescence microscope is based on the phenomenon that certain material emits energy detectable as visible light when irradiated with the light of a specific wavelength. The sample can either be fluorescing in its natural form (like chlorophyll) or it may be treated with a fluorescing stain.

A basic fluorescence microscope that is well known in the art includes a light source and several filters that correspond to a wavelength matching a fluorescence stain. An excitation filter is provided for selecting an excitation wavelength of light from the light source, and a dichroic beamsplitter reflects light from the light source to illuminate the specimen. The illuminated light is separated from the much weaker emitted fluorescence with an emission filter. The fluorescing areas can be observed in the microscope and shine out against a dark background with high contrast.

Fluorescence microscopes use a special lighting system to view a specimen that has been treated with a fluorescent stain. The lighting system requires a special light source that, amongst other things, outputs a high level of light at certain key wavelengths that correlate to peak excitation wavelengths of corresponding fluorescent stains. The light source must be very powerful since the vast majority of the light needs to be filtered out to produce a nearly monochromatic, dichromatic, or trichromatic source. Most manufacturers currently use either mercury or xenon light sources, or in some cases, metal halide sources. Regardless of the type of light source used, the sources typically have a power rating of about 50 to 200 watts.

The most commonly used light sources are mercury and xenon arc type lamps. These arc type lamps require an expensive power supply to obtain a stable arc and produce a stable image of the specimen. The arc type lamps also have a relatively short life (about 200 hours) that requires laboratories to change and realign the lamp bulb frequently. Arc type lamps are also notoriously expensive; thus, frequent replacement can significantly increase laboratory costs. Furthermore, certain lamps are considered hazardous material, which complicates the disposal of the spent bulb.

Arc type lamps also feature a very small arc, which requires precision complex optics to properly enlarge the light source and fill the field of the microscope's optical system when a new lamp is installed. To align and focus the arc, a collector lens focus slider is used until one or two bow-tie shaped images (simulating a focused image of the arc and its mirror image) appear in the window. A lamp house mirror position slider is used to make the intensity of the two arc images approximately equal, and arc lamp horizontal and vertical sliders are utilized to overlay the two arc images into a single image. When the sliders have been adjusted to produce a small arc image in the center of the window, a collector lens focus slider is used to enlarge the arc image until it fills the entire window with a uniform field of illumination. As it can be seen, aligning and focusing an arc type lamp is complex and time-consuming.

A cheaper, more accurate, and more reliable alternative to an arc type lamp is a solid state light source, such as a light emitting diode (LED). LEDs are cheap, powerful, long-lasting sources of light. Moreover, a wide spectrum light source, such as an arc type lamp, provides a great deal of light that must be efficiently filtered out of the illumination to provide for an adequate signal to noise ratio. An LED's narrow bandwidth eliminates a great deal of the undesirable light, thereby reducing the requirements for filtration.

Nonetheless, there are several drawbacks to using LEDS within a fluorescence microscope. Each fluorescence stain fluoresces at a different wavelength; and therefore, each stain must be illuminated with a different monochromatic light source. Most users utilize several different stains. Thus, a microscope having a single LED would be severely limited in application.

The microscope may include multiple LEDs having different wavelengths, wherein the user may switch between LEDs to view differently stained specimens. However, each LED requires specific optical filters for filtering the light. Thus, the user would need to manually select and change the filters each time a new LED is installed within the microscope. Not only is this process time-consuming and cumbersome, it is susceptible to human error. Using an incorrect filter can cause damage to a user's eye. Thus, it is desired to provide a solid state fluorescence light system for a fluorescence microscope that can be used to view a variety of stains, that is easy to use, and that is not prone to human error.

SUMMARY

An illumination system for a fluorescence microscope is provided. The illumination system includes a carriage removably receivable within the microscope and a plurality of filter cubes movably arranged on the carriage, wherein each filter cube is moveable between an active position and an inactive position. Each filter cube includes a housing having first and second openings and a solid state light source secured to the housing. The solid state light source emits light when the filter cube is moved into the active position. Each filter cube further comprises at least one optical filter disposed within the housing, wherein the optical filter corresponds to the solid state light source.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein.

DETAILED DESCRIPTION

A representative embodiment of a solid state fluorescence light system 10 will now be described with reference to the drawings where like numerals correspond to like elements. The present disclosure is directed to a solid state fluorescence light system 10 to be used for viewing a specimen with a fluorescence microscope. Although an exemplary embodiment of the solid state fluorescence light assembly 10 will be described hereinafter with reference to fluorescence microscopes, it will be appreciated that aspects of the solid state fluorescence light assembly 10 have wide application, and may be suitable for use with other devices. Accordingly, the following descriptions and illustrations herein should be considered illustrative in nature, and thus, not limiting the scope of the present disclosure.

Figure 1:
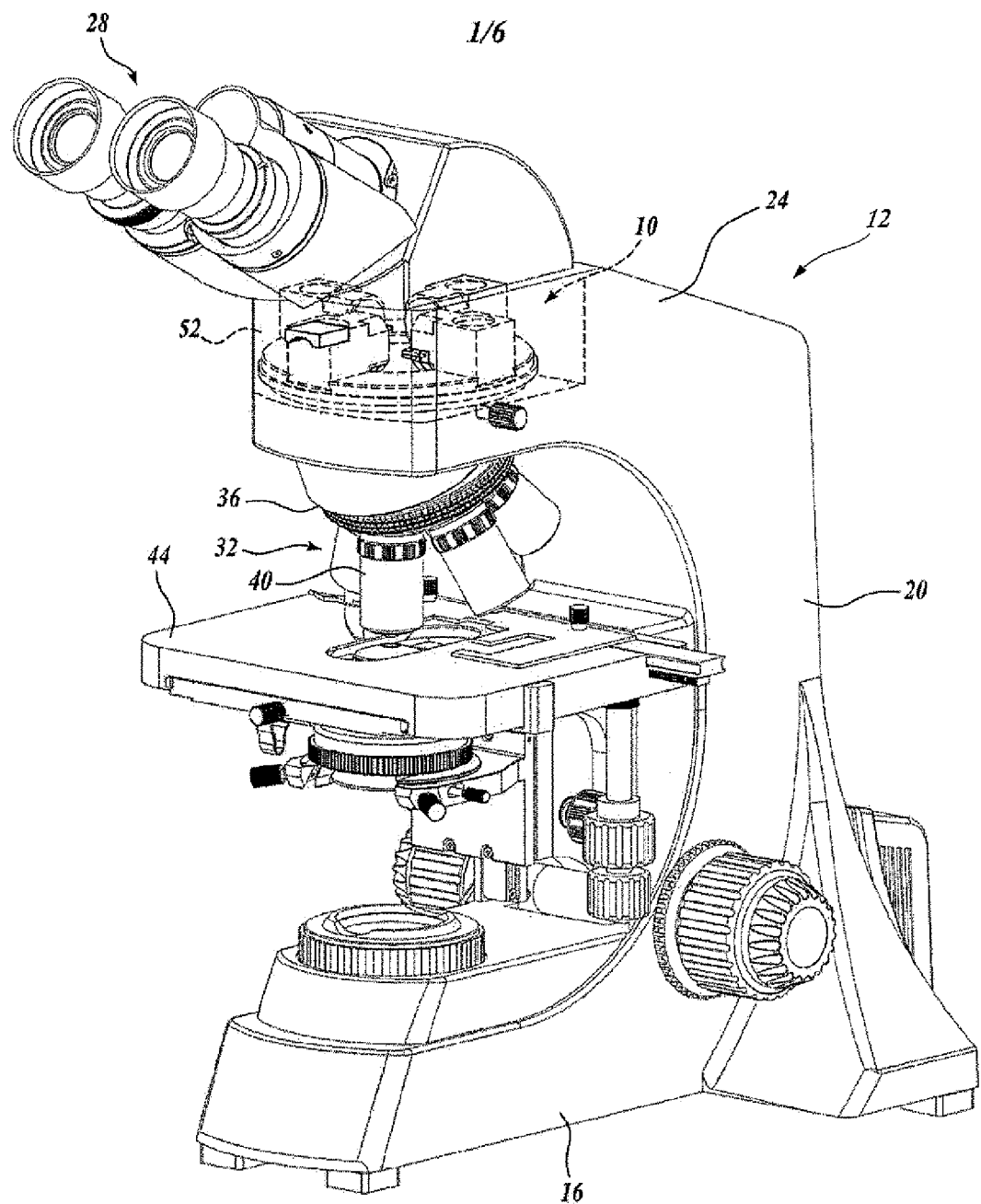
FIG. 1 is an environmental view of a representative embodiment of a solid state fluorescence light system shown in combination with a microscope for use with the solid state fluorescence light system.

Referring to FIG. 1, the solid state fluorescence light assembly 10 is shown in combination with a fluorescence microscope 12. Although any suitable fluorescence microscope may be used, the depicted fluorescence microscope 12 includes a base 16 and an arm 20 extending upwardly from the base 16. An upper support 24 is secured to the arm 20 and extends outwardly therefrom in a substantially transverse manner such that it is positioned above the base 16. It should be appreciated that the base 16, the arm 20, and the upper support 24 may be formed as an integral piece.

The microscope 12 further includes an eyepiece assembly 28 secured to the top surface of the upper support 24 in any suitable manner and an objective lens assembly 32 secured to the bottom surface of the upper support 24. The objective lens assembly 32 includes a turret 36 and a plurality of objective lenses 40 secured thereto, wherein the turret 36 is pivotally mounted to the bottom surface of the upper support 24. The objective lenses 40 are positionable over a stage 44 that is secured to the arm 20 and extends outwardly therefrom. The stage 44 is adapted to receive a specimen tray 48 (shown in FIG. 3) that is viewable through the eyepiece assembly 28 and the objective lens assembly 32 in a manner well known in the art. It should be appreciated that any other suitable microscope assembly may instead be used without departing from the spirit and scope of the present disclosure.

Figure 2:
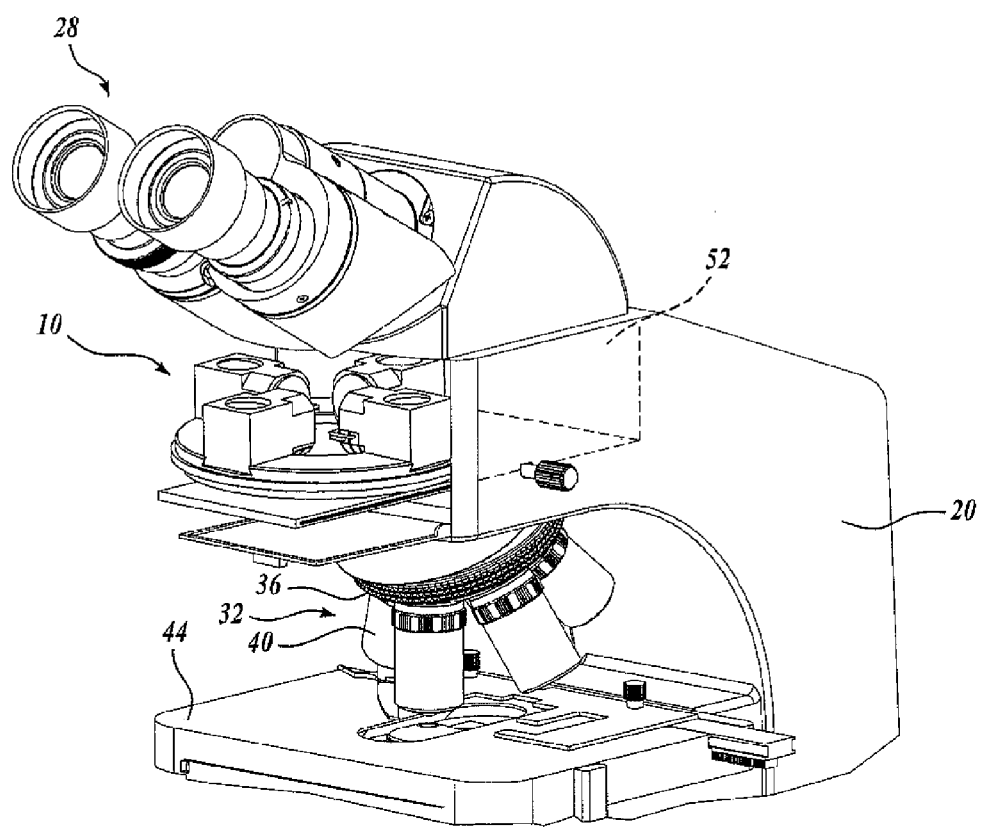
FIG. 2 is an isometric view of the solid state fluorescence light system of FIG. 1 being received within the microscope of FIG. 1.

Referring to FIGS. 1 and 2, the fluorescence microscope 12 further includes a receptacle 52 disposed between the eyepiece assembly 28 and the objective lens assembly 32 that is adapted to removably receive the solid state fluorescence light assembly 10 in any suitable manner. A door, opening, etc. may be formed in the microscope 12 for accessing the interior of the receptacle 52 when using the solid state fluorescence light assembly 10. The solid state fluorescence light assembly 10 is received within the receptacle 52 such that it is properly disposed between the eyepiece assembly 28 and the objective lens assembly 32 for illuminating the specimen, as will be described below.

Figure 3:
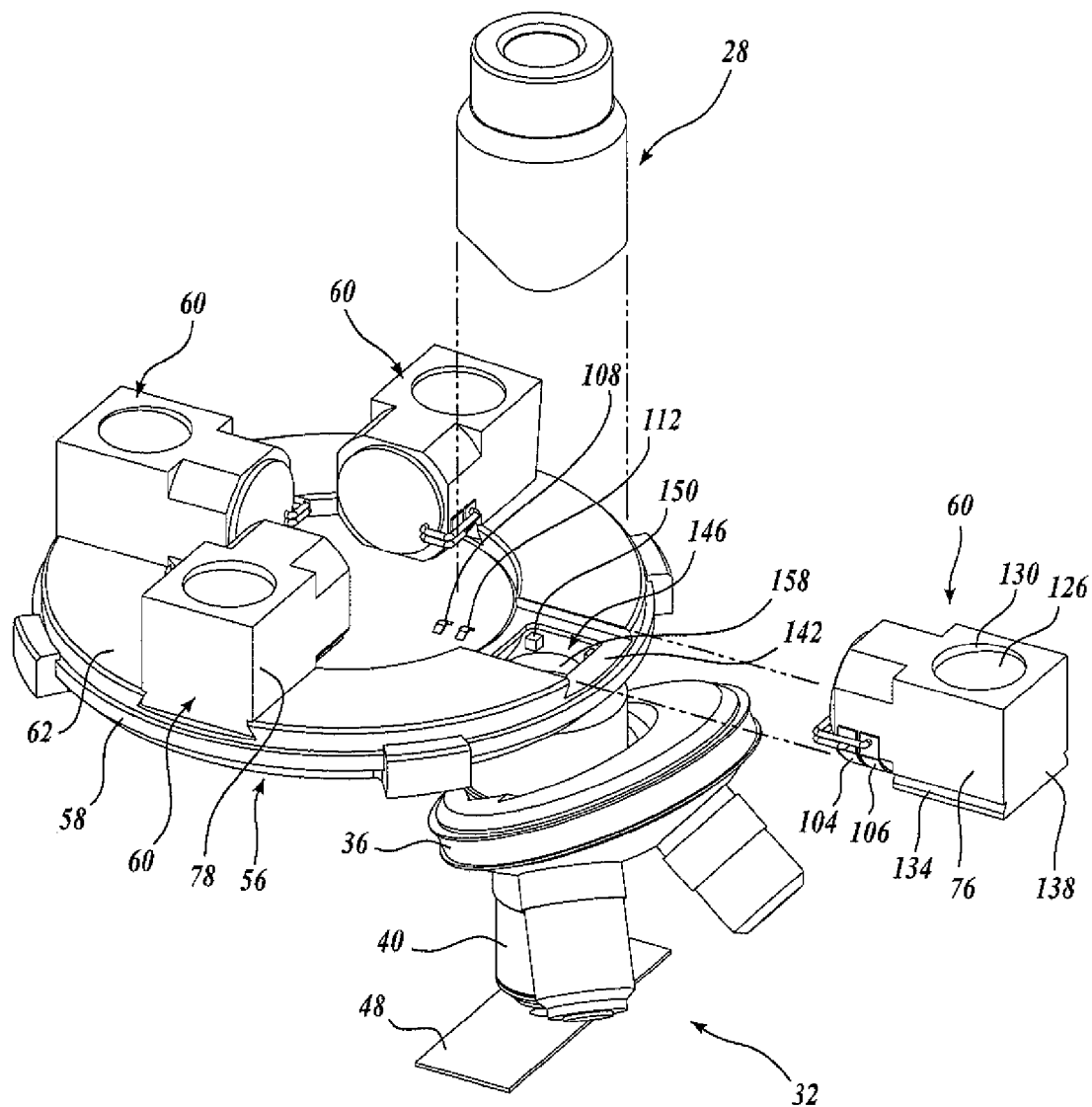
FIG. 3 is a partially exploded view of the solid state fluorescence light system of FIG. 1 shown in use with a portion of a microscope.

Referring to FIG. 3, the solid state fluorescence light assembly 10 will now be described in detail. The solid state fluorescence light assembly 10 is incorporated into the fluorescence microscope 12 to selectively provide solid state lighting for viewing a fluorescence-stained specimen. The solid state fluorescence light assembly 10 includes a carriage 56 having a plurality of filter cubes 60 movably received on the carriage 56. The carriage 56 is substantially circular in shape and includes a carriage base 58 and a rotatable plate 62 disposed thereon. A suitable bearing assembly (not shown) is disposed between the plate 62 and the carriage base 58 to allow the plate 62 to rotate freely with respect to the carriage base 58. The carriage 56 may instead include a plate that slides linearly with respect to the carriage base, and the carriage 56 may instead be any other suitable shape, such as square or rectangular. The carriage 56 is received within the receptacle 52 such that a user may access the plate 62 and move the plate 62 relative to the base 58.

Figure 5:
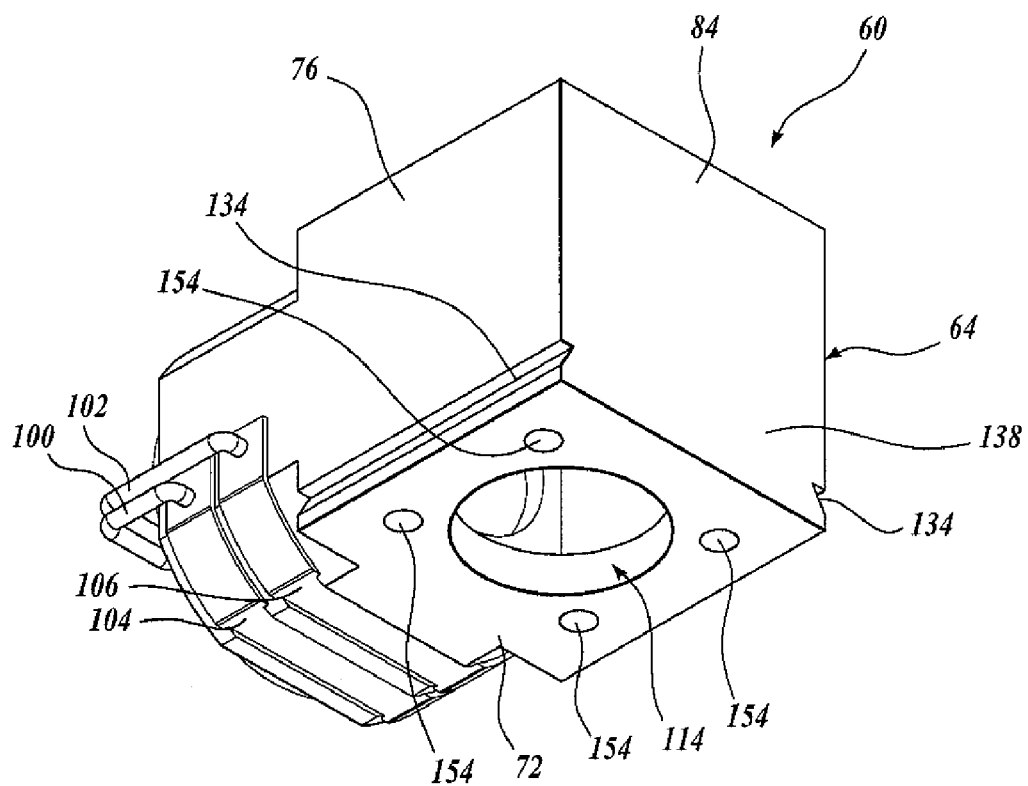
FIG. 5 is an isometric view of a filter cube of the solid state fluorescence light system of FIG. 1.
Figure 6:
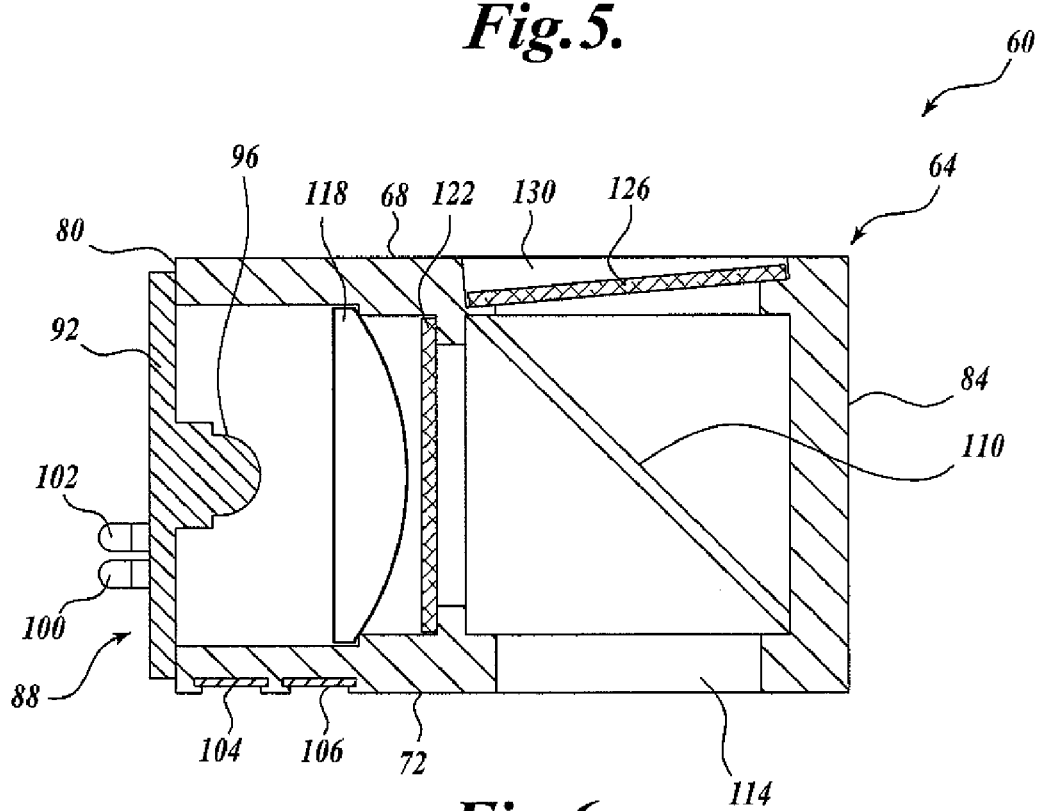
FIG. 6 is a cross sectional view of the filter cube of FIG. 5.

Referring to FIGS. 5 and 6, each filter cube 60 provides a solid state light source having a specific wavelength for accommodating a specific fluorescence stain of a specimen. Each filter cube 60 includes a housing 64 for securing the solid state light source to the carriage 56, wherein the solid state light source is preferably disposed at least partially within the housing 64. The housing 64 is comprised of metal or any other suitable material and having a black anodized reflective coating applied to the interior surface. The housing 64 may be any suitable shape, but is preferably substantially rectangular in shape and includes a top 68, a bottom 72, first and second sides 76 and 78, an open first end 80, and a second end 84. The filter cube 60 may include a mark or label (not shown) on the exterior of the housing 64 for identifying the wavelength of the solid state lighting disposed therewithin.

Although any suitable solid state light source may be used, a light emitting diode assembly 88 is preferably secured to the housing 64 to enclose the first end 80. The light emitting diode assembly 88 includes a circuit board 92 secured to the exterior of the housing 64 and a light emitting diode (LED) 96 mounted to the circuit board 92. If higher output is desired, more than one LED 96 may be mounted to the circuit board 92, wherein each LED could be coupled to a fiber optic light guide that produces a homogenized output of high intensity, monochromatic light.

The LED 96 is wired on the circuit board 92 in any suitable manner and is directed towards the interior of the housing 64. A pair of wires 100 and 102 (power and ground) are electrically connected to the circuit board 92 and extend outwardly from the bottom of the circuit board 92. The wires 100 and 102 wrap around the exterior of the housing 64 and connect to first and second contacts 104 and 106 disposed on the exterior of the housing 64. The first and second contacts 104 and 106 extend across the bottom surface of the housing 64 and are adapted to be placed into electrical communication with first and second power connectors 108 and 112 arranged on the base 58 of the carriage 56. (See FIG. 3). The LED 96 emits light at a predetermined wavelength to cause a specific stain on a specimen to fluoresce.

Figure 4:
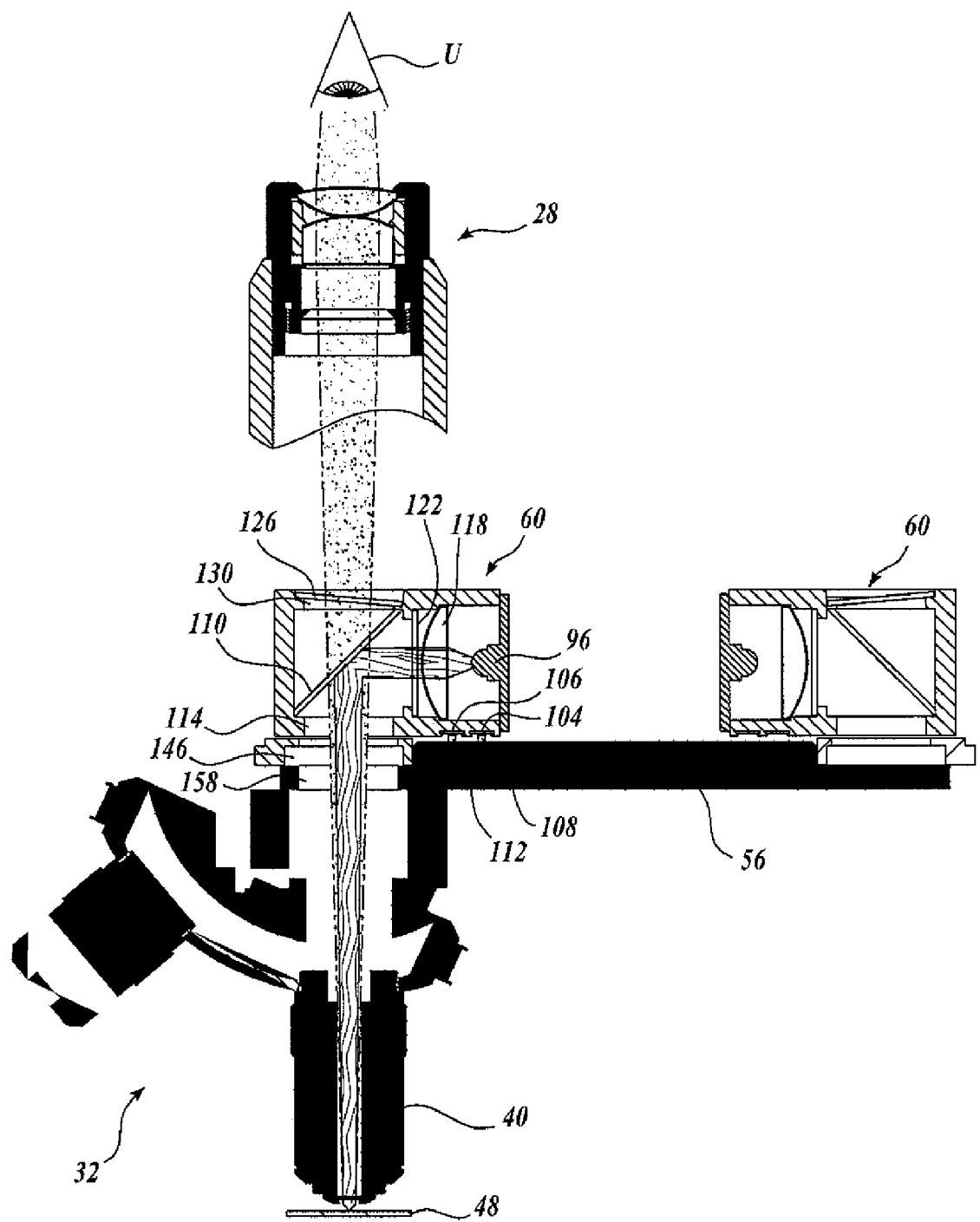
FIG. 4 is a cross sectional view of the solid state fluorescence light system shown in FIG. 3.

Referring to FIGS. 4 and 6, each filter cube 60 includes at least one optical filter disposed within the housing 64 that corresponds to the wavelength of the LED 96 within the housing 64. A dichroic beamsplitter 110 corresponding to the wavelength of the LED 96 is secured within the housing 64 and is adapted to reflect light emitted from the LED 96. The beamsplitter 110 reflects the light through a bottom opening 114 in the bottom 72 of the housing 64 and down towards the specimen tray 48. An optional condenser lens 118 corresponding to the wavelength of the LED 96 is secured within the housing 64 and is positioned between the LED 96 and the beamsplitter 110 to concentrate the light emitted from the LED 96. In addition, an optional corresponding excitation filter 122 is secured within the housing 64 and positioned between the condenser lens 118 and the beamsplitter 110.

A top opening 130 is formed in the top 68 of the housing 64 above the beamsplitter 110. Light emitted from the specimen passes up through the bottom opening 114, through the beamsplitter 110, and towards the top opening 130. A barrier or emission filter 126 corresponding to the wavelength of the LED 96 is secured within the top opening 130 and is adapted to transmit the fluorescence from the specimen and block any reflected excitation light. The fluorescence is transmitted to the eyepiece assembly 28 such that a user U may view the specimen.

The beamsplitter 110 and the filters 122 and 126 are disposed within the housing 64 so that they remain tied to the LED 96 when the filter cube 60 is moved on the carriage 56. In this manner, the LED 96 is necessarily used with the correct filter assembly. This design avoids wasted time in searching for the proper filter, and it prevents the users from inadvertently using the wrong filters and possibly damaging their eye.

Referring back to FIG. 3, the filter cubes 60 are removably received on the plate 62 of the carriage 56 to enable a user to arrange a variety of different filter cubes on the carriage 56. Although any suitable number of filter cubes 60 may be arranged on the carriage 56, preferably four filter cubes 60 are arranged on the carriage 56 and are spaced equidistant from one another. The filter cubes 60 include a groove 134 formed along the bottom edge of each side 76 of the housing 64 to define a tail section 138 on the bottom 72 of the housing 64. The plate 62 includes a corresponding socket 142 adapted to slidably receive the tail section 138 to define a sliding dovetail joint therebetween. Thus, a user has the freedom to interchange filter cubes 60 as needed for viewing different stains. It should be appreciated that the filter cubes 60 may be removably secured to the plate 62 in any other suitable manner. Moreover, the filter cubes 60 may instead be fixedly secured to the plate 62, such that the user substitutes the entire carriage 56 when a different filter cube 60 is needed to view a fluorescence stain.

The plate 62 includes a plate opening 146 that is positionable over a carriage base opening 158, wherein the carriage base opening 158 is aligned with an objective lens 40 on the objective assembly 32. The filter cubes 60 are received on the plate 62 such that the bottom opening 114 aligns with the plate opening 146.

Referring to FIGS. 3 and 4, the filter cubes 60 are rotatable with the plate 62 relative to the carriage base 58 to selectively position one of the filter cubes 60 above the carriage base opening 158, or in an "active" position. The first and second power connectors 108 and 112 are disposed on the carriage base 58 adjacent the carriage base opening 158 such that when a filter cube 60 moves into a position above the carriage base opening 158, the first and second contacts 104 and 106 of the filter cube 60 come into electrical communication with the first and second power connectors 108 and 112. Preferably, the first and second power connectors 108 and 112 are spring loaded to ensure contact between the first and second power connectors 108 and 112 and the first and second contacts 104 and 106. The first and second power connectors 108 and 112 are in electrical communication with a suitable power source (not shown) to illuminate the LED 96. Thus, when a filter cube 60 is moved into the active position, the LED 96 automatically emits light to illuminate the specimen. In this manner, a user does not need to connect the LED 96 to a power source when the filter cube 60 is moved into the active position, and likewise does not need to disconnect the LED 96 from the power source when the filter cube 60 is moved out of the active position.

Referring to FIGS. 3 and 5, a plurality of filter cube identification sensors 150 are positioned on the carriage base 58 adjacent to the carriage base opening 158 for sensing the filter cube 60 when it is moved into the active position. Each filter cube 60 includes at least one filter cube identification tag 154 disposed on the bottom 72 of the housing 64 that is readable by at least one of the cube identification sensors 150. Upon sensing the filter cube identification tag 154 of the specific filter cube 60, the cube identification sensors 150 produce an output signal that identifies the wavelength of the LED 96 disposed within the filter cube housing 64. The sensor output signals are received by a suitable programmable logic controller (PLC) that controls the operation of the fluorescence microscope 12. Depending on the LED wavelength, the PLC may output signals to adjust the power, the digital imaging, etc. Moreover, the microscope 12 may be adapted to receive input signals from a user that identifies the type of stain being used on the specimen. In that case, the PLC may also signal an alarm or shut off the power if, for instance, the LED does not correspond to the fluorescence stain on the specimen. This would prevent a user from inadvertently viewing the specimen with the wrong LED.

Referring to FIGS. 1 and 2, to use the fluorescence microscope 12, the user first selects the stained specimen to be viewed and appropriately places the specimen on the specimen tray 48. The specimen tray 48 is thereafter positioned on the stage 44 beneath an objective lens 40 of the objective assembly 32. The user then chooses the appropriate filter cube 60 for viewing the specimen, which is dependent on the wavelength of the LED 96. The plate 62 of the carriage 56 is rotated relative to the base 58 until the appropriate filter cube 60 is moved into the active position and the LED 96 is illuminated. The user may interchange the filter cubes 60 on the carriage 56 to view a variety of different fluorescence stains, or he/she may instead exchange the entire carriage 56.

Figure 7:
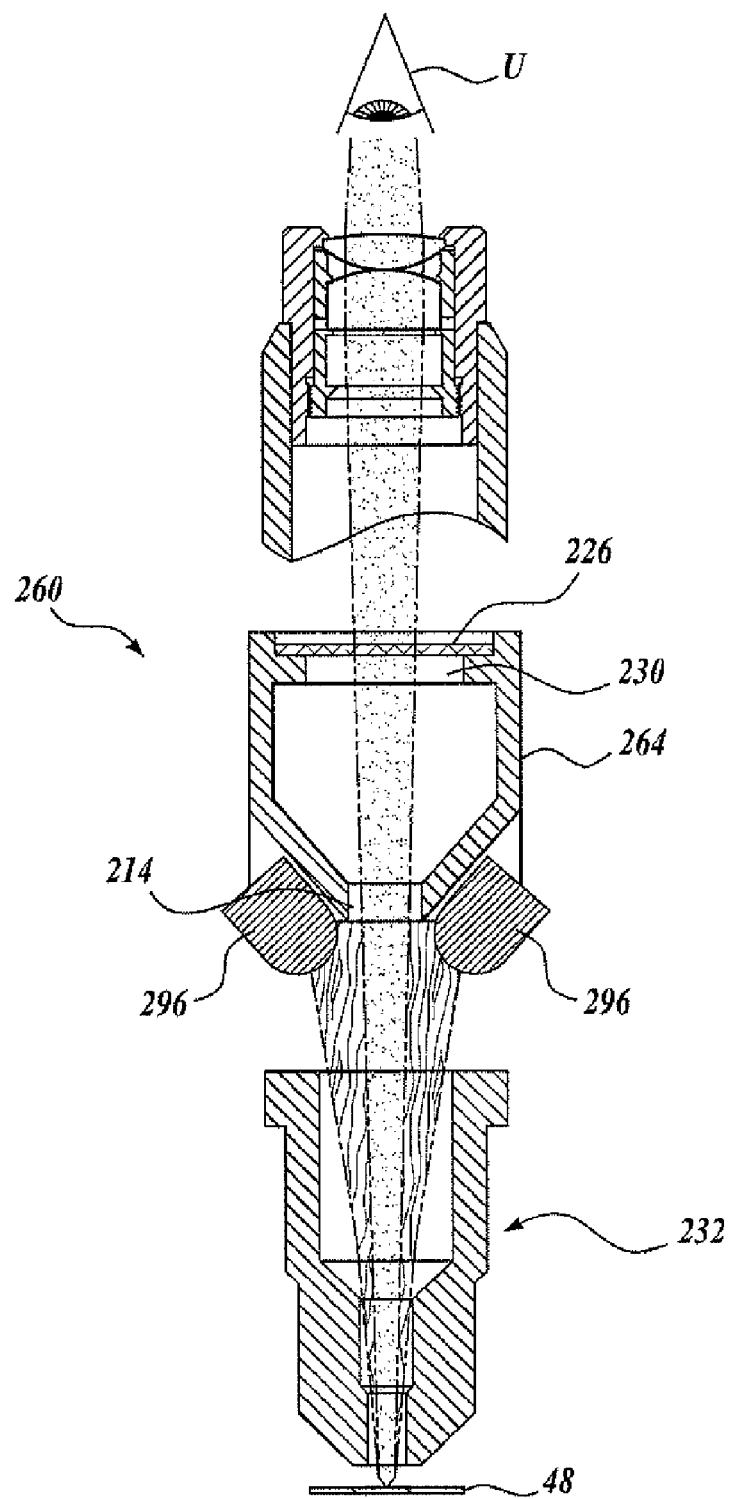
FIG. 7 is a cross sectional view of an alternate embodiment of the solid state fluorescence light system of FIG. 1.

Referring to FIG. 7, an alternate embodiment of a filter cube 260 is depicted. The filter cube 260 is substantially identical to the filter cube 60 described above except for the following exceptions. The filter cube 260 includes a housing 264 having a bottom opening 214 and a top opening 230. A plurality of LEDs 296 are disposed on the sides of the housing 264 such that they project light downwardly toward the objective assembly 232. In this manner, no beamsplitter is needed and costs are further reduced. The light emitted from the specimen projects upwardly through the bottom opening 214 and towards the top opening 230. A barrier filter 226 may be disposed within the top opening 230 for transmitting the fluorescence from the specimen and blocking any reflected excitation light.

While illustrative embodiments have been illustrated and described, it will be appreciated that various changes can be made therein without departing from the spirit and scope of the present disclosure.

The embodiment of the present disclosure in which an exclusive property or privilege is claimed are defined as follows:

1. An illumination system for a fluorescence microscope, the illumination system comprising:
  (a) a carriage removably receivable within a microscope;
  (b) a first filter cube movably arranged on the carriage, the first filter cube moveable on the carriage between an active position and an inactive position, the first filter cube comprising:

(i) a first housing having first and second openings;
(ii) a first solid state light source secured to the first housing, the first solid state light source adapted to emit light having a first wavelength that causes a first material to fluoresce, wherein the first solid state light source is adapted to emit light when the first filter cube is moved into the active position; and
(iii) at least one optical filter disposed within the first housing, the at least one optical filter corresponding to the first solid state light source; and
(c) a second filter cube movably arranged on the carriage, the second filter cube moveable on the carriage between an active position and an inactive position, the second filter cube comprising:
(i) a second housing having first and second openings;
(ii) a second solid state light source secured to the second housing, the second solid state light source adapted to emit light having a second wavelength that causes a second material to fluoresce, wherein the second solid state light source is adapted to emit light when the second filter cube is moved into the active position and wherein the second wavelength is different from the first wavelength; and
(iii) at least one optical filter disposed within the second housing, the at least one optical filter corresponding to the second solid state light source.

2. The illumination system of claim 1, wherein the at least one optical filter disposed within the first housing is a beamsplitter adapted to reflect light emitted from the first solid state light source toward the first opening, and adapted to direct light of a predetermined wavelength towards the second opening.

3. The illumination system of claim 1, wherein the first and second solid state light sources are light emitting diodes.

4. The illumination system of claim 1, further comprising a first barrier filter corresponding to the first solid state light source, the first barrier filter disposed within the second opening of the first housing and adapted to selectively pass light though the second opening of the first housing.

5. The illumination system of claim 1, further comprising a first excitation filter corresponding to the first solid state light source, the first excitation filter disposed within the first housing and adapted to select a first excitation wavelength of light from the first solid state light source.

6. The illumination system of claim 1, wherein the carriage includes a power connector in communication with a power source.

7. The illumination system of claim 6, wherein the first and second filter cubes each includes a contact adapted to engage the power connector when the corresponding filter cube is moved into the active position.

8. The illumination system of claim 1, wherein the first and second filter cubes are removably received on the carriage.

9. The illumination system of claim 1, wherein the at least one optical filter disposed within the first housing corresponds to the first wavelength of light emitted from the first solid state light source and wherein the at least one optical filter disposed within the second housing corresponds to the second wavelength of light emitted from the second solid state light source.

10. An illumination system for a fluorescence microscope, the illumination system comprising:
(a) a carriage removably receivable within a microscope;
(b) a plurality of filter cubes movably arranged on the carriage, wherein each filter cube is moveable on the carriage between an inactive position and an active position, each filter cube comprising:
(i) a housing having first and second openings;
(ii) a solid state light source secured to the housing, the solid state light source adapted to emit light having a predetermined wavelength that causes a predetermined material to fluoresce; and
(ii) at least one optical filter disposed within the housing, the at least one optical filter corresponding to the solid state light source; and
(c) means for illuminating the solid state light source when the corresponding filter cube is moved into the active position, wherein the predetermined wavelength corresponding to the solid state light source for each filter cube is different.

11. The illumination system of claim 10, wherein the means for illuminating the solid state light source comprises:
(a) a power connector disposed on the carriage and in electrical communication with a power source; and
(b) a contact provided on each of the plurality of filter cubes, wherein each contact is adapted to engage the power connector when the corresponding filter cube is moved into the active position.

12. The illumination system of claim 10, wherein the at least one optical filter is a beamsplitter adapted to reflect light emitted from the solid state light source toward the first opening, and adapted to direct light of a predetermined wavelength towards the second opening.

13. The illumination system of claim 10, wherein the solid state light source is a light emitting diode.

14. The illumination system of claim 10, further comprising a barrier filter corresponding to the solid state light source, the barrier filter disposed within the second opening and adapted to selectively pass light through the second opening.

15. The illumination system of claim 10, wherein the filter cubes are removably received on the carriage.

16. The illumination system of claim 10, further comprising an excitation filter corresponding to the solid state light source, the excitation filter disposed within the housing and adapted to select an excitation wavelength of light from the light source.

17. The illumination system of claim 10, wherein the at least one optical filter corresponds to the predetermined wavelength of light emitted from the corresponding solid state light source.

18. A fluorescence microscope, comprising:
(a) an objective assembly;
(b) a receptacle disposed above the objective assembly;
(c) a carriage removably receivable within the receptacle;
(d) a plurality of filter cubes movably arranged on the carriage, wherein each filter cube is moveable on the carriage between an active position and an inactive position, each filter cube comprising:
(i) a housing having first and second openings;
(ii) a solid state light source secured to the housing, wherein the solid state light source is adapted to emit light when the filter cube is moved into the active position, the solid state light source adapted to emit light having a predetermined wavelength that causes a predetermined material to fluoresce; and
(ii) at least one optical filter disposed between the first and second openings of the housing, the at least one optical filter corresponding to the solid state light source; and
(e) an eyepiece assembly disposed above the second opening of the housing, wherein the predetermined wavelength corresponding to the solid state light source for each filter cube is different.

19. The microscope of claim 18, further comprising a barrier filter disposed within the second opening of the housing and corresponding to the solid state light source.

20. The microscope of claim 18, wherein the at least one optical filter is a beamsplitter adapted to reflect light emitted from the corresponding solid state light source toward the objective assembly and allow light of a predetermined wavelength to pass from the first opening to the second opening.

21. The microscope of claim 18, further comprising an excitation filter corresponding to the solid state light source, the excitation filter disposed within the housing and adapted to select an excitation wavelength of light from the light source.

22. The microscope of claim 18, further comprising means for selectively placing one of the plurality of filter cubes into electrical communication with a power source when the filter cube is moved into the active position.

23. The microscope of claim 22, wherein the means for selectively placing one of the plurality of filter cubes into electrical communication with a power source comprises:
   (a) a power connector disposed on the carriage and in electrical communication with the power source; and
   (b) a contact provided on each of the plurality of filter cubes, wherein each contact is adapted to engage the power connector when the corresponding filter cube is moved into the active position.

24. The microscope of claim 18, wherein the solid state light source is a light emitting diode.

25. The microscope of claim 18, further comprising a barrier filter corresponding to the solid state light source, the barrier filter disposed within the second opening and adapted to selectively pass light through the second opening.

26. The microscope of claim 18, wherein the filter cubes are removably received on the carriage.

27. The microscope of claim 18, wherein the at least one optical filter corresponds to the predetermined wavelength of light emitted from the corresponding solid state light source.

28. A fluorescence microscope, comprising:
   (a) an objective assembly;
   (b) a receptacle disposed above the objective assembly;
   (c) a carriage removably receivable within the receptacle;
   (d) a plurality of filter cubes movably arranged on the carriage, wherein each filter cube is moveable on the carriage between an active position and an inactive position, each filter cube comprising:
      (i) a housing having first and second openings;
      (ii) a solid state light source secured to the housing, the solid state light source adapted to emit light having a predetermined wavelength that causes a predetermined material to fluoresce; and
      (iii) at least one optical filter disposed between the first and second openings of the housing, the at least one optical filter corresponding to the solid state light source;
   (e) an eyepiece assembly disposed above the second opening of the housing; and
   (f) means for illuminating the solid state light source when the corresponding filter cube is moved into the active position, wherein the predetermined wavelength corresponding to the solid state light source for each filter cube is different.

29. The microscope of claim 28, further comprising a barrier filter corresponding to the solid state light source, the barrier filter disposed within the second opening and adapted to selectively pass light through the second opening.

30. The microscope of claim 28, wherein the at least one optical filter is a beamsplitter adapted to reflect light emitted from the corresponding solid state light source toward the objective assembly and allow light of a predetermined wavelength to pass from the first opening to the second opening.

31. The microscope of claim 28, further comprising an excitation filter corresponding to the solid state light source, the excitation filter disposed within the housing and adapted to select an excitation wavelength of light from the light source.

32. The microscope of claim 28, wherein the means for illuminating the solid state light source comprises:
   (a) a power connector disposed on the carriage and in electrical communication with a power source; and
   (b) a contact provided on each of the plurality of filter cubes, wherein each contact is adapted to engage the power connector when the corresponding filter cube is moved into the active position.

33. The microscope of claim 28, wherein the solid state light source is a light emitting diode.

34. The microscope of claim 28, wherein the filter cubes are removably received on the carriage.

35. The microscope of claim 28, wherein the at least one optical filter corresponds to the predetermined wavelength of light emitted from the corresponding solid state light source.

* * * * *

UNITED STATES PATENT AND TRADEMARK OFFICE
CERTIFICATE OF CORRECTION

PATENT NO. : 7,502,164 B2
APPLICATION NO. : 11/838814
DATED : March 10, 2009
INVENTOR(S) : Steven W. Lytle and Kevin G. Cassady It is certified that error appears in the above-identified patent and that said Letters Patent is hereby corrected as shown below:

Col. 7, Line 39, please delete "though" and insert --through--, therefor.

Signed and Sealed this

Ninth Day of March, 2010

David J. Kappos
*Director of the United States Patent and Trademark Office*